United States Patent
Black et al.

(10) Patent No.: US 8,032,711 B2
(45) Date of Patent: Oct. 4, 2011

(54) PREFETCHING FROM DYNAMIC RANDOM ACCESS MEMORY TO A STATIC RANDOM ACCESS MEMORY

(75) Inventors: Bryan Black, Austin, TX (US); Murali M. Annavaram, Austin, TX (US); Donald W. McCauley, Lakeway, TX (US); John P. Devale, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 603 days.

(21) Appl. No.: 11/644,358

(22) Filed: Dec. 22, 2006

(65) Prior Publication Data

US 2008/0155196 A1  Jun. 26, 2008

(51) Int. Cl.
  G06F 12/06 (2006.01)
  G06F 13/16 (2006.01)
(52) U.S. Cl. .................. 711/137; 711/E12.057
(58) Field of Classification Search .......... 711/137
  See application file for complete search history.

(56) References Cited

U.S. PATENT DOCUMENTS

| | | | |
|---|---|---|---|
| 5,659,713 A | 8/1997 | Goodwin et al. | |
| 5,778,436 A | 7/1998 | Kedem et al. | |
| 6,055,622 A * | 4/2000 | Spillinger | 712/207 |
| 6,061,073 A * | 5/2000 | Larson | 345/501 |
| 6,317,810 B1 * | 11/2001 | Lopez-Aguado et al. | 711/120 |
| 6,341,334 B1 | 1/2002 | Kamemaru | |
| 6,446,167 B1 * | 9/2002 | Mayfield et al. | 711/122 |
| 6,690,604 B2 | 2/2004 | Hsu et al. | |
| 6,820,173 B1 | 11/2004 | Bittel et al. | |
| 6,983,356 B2 | 1/2006 | Rotithor et al. | |
| 7,487,296 B1 * | 2/2009 | Iacobovici et al. | 711/137 |
| 7,533,242 B1 * | 5/2009 | Moll et al. | 711/213 |
| 2002/0144083 A1 | 10/2002 | Wang et al. | |
| 2002/0199179 A1 | 12/2002 | Lavery et al. | |
| 2003/0088740 A1 * | 5/2003 | Henry et al. | 711/137 |
| 2003/0105940 A1 * | 6/2003 | Cooksey et al. | 711/203 |
| 2004/0123043 A1 | 6/2004 | Rotithor et al. | |
| 2004/0133736 A1 | 7/2004 | Kyung | |
| 2004/0164334 A1 * | 8/2004 | Masleid et al. | 257/296 |
| 2004/0268050 A1 * | 12/2004 | Cai et al. | 711/137 |
| 2004/0268051 A1 * | 12/2004 | Berg et al. | 711/137 |

(Continued)

FOREIGN PATENT DOCUMENTS

EP 0908892 4/1999

(Continued)

OTHER PUBLICATIONS

Y. K. Tsui et al., "Three-Dimensional Packaging for Multi-Chip Module with Through-the-Silicon Via Hole," Hong Kong University of Science and Technology, Kowloon, Hong Kong, China, 2003.*

(Continued)

*Primary Examiner* — Shane M Thomas
*Assistant Examiner* — Hal Schnee
(74) *Attorney, Agent, or Firm* — Blakely, Sokoloff, Taylor & Zafman LLP

(57) ABSTRACT

Embodiments of the invention are generally directed to systems, methods, and apparatuses for prefetching from a dynamic random access memory (DRAM) to a static random access memory (SRAM). In some embodiments, prefetch logic receives a prefetch hint associated with a load instruction. The prefetch logic may transfer two or more cache lines from an open page in the DRAM to the SRAM based, at least in part, on the prefetch hint.

18 Claims, 7 Drawing Sheets

U.S. PATENT DOCUMENTS

| | | | |
|---|---|---|---|
| 2005/0071542 A1* | 3/2005 | Weber et al. | 711/105 |
| 2005/0216678 A1* | 9/2005 | Jeddeloh | 711/154 |
| 2006/0041711 A1 | 2/2006 | Miura et al. | |
| 2006/0041723 A1* | 2/2006 | Hakura et al. | 711/137 |
| 2006/0179236 A1 | 8/2006 | Shafi | |
| 2006/0181953 A1 | 8/2006 | Rotenberg et al. | |
| 2006/0248281 A1* | 11/2006 | Al-Sukhni et al. | 711/137 |
| 2007/0005902 A1 | 1/2007 | Petersen et al. | |
| 2007/0043907 A1* | 2/2007 | Diefendorff | 711/137 |
| 2007/0136534 A1* | 6/2007 | Mesard et al. | 711/137 |
| 2007/0290315 A1* | 12/2007 | Emma et al. | 257/686 |
| 2008/0098176 A1* | 4/2008 | Krishna et al. | 711/137 |

FOREIGN PATENT DOCUMENTS

| | | |
|---|---|---|
| JP | 11272552 | 8/1999 |
| WO | WO-0148618 | 7/2001 |
| WO | WO-2004059720 | 7/2004 |
| WO | WO-2006012418 | 2/2006 |
| WO | WO-2006055477 | 5/2006 |

OTHER PUBLICATIONS

Kyle J. Nesbit and James E. Smith, "Data Cache Prefetching Using Global History Buffer," IEEE Computer Society, publication 0272-1732/05, Jan.-Feb. 2005, pp. 90-97.*

Search Report for counterpart foreign application P25147GB dated Mar. 20, 2008.

Pending U.S. Appl. No. 11/286,585, filed Nov. 22, 2005 (inventor: McCauley et al.).

Pending U.S. Appl. No. 11/374,936, filed Mar. 14, 2006 (Inventor Black et al.).

Black, et al., "3D Processing Technology and its Impact on iA32 Microprocessors", Proceedings of the IEEE Int'l Conference on Computer Design (ICCD'04), 3 pages.

Genua, et al., "A Cache Primer", Freescale Semiconductor, Inc., 2004, AN2663, Rev. 1, Oct. 2004, pp. 1-15.

Gochman, et al., "Introduction to Intel Core Duo Processor Architecture", Intel Technology Journal vol. 10, Iss 02, May 15, 2006; ISSn 1535-864X, pp. 89-98.

Mendelson, et al., "MP Implementation in Systems Based on the Intel Core Duo Processor", Intel Technology Journal ol. 10, Iss 02, May 15, 2006; ISSN 1535-864X, pp. 99-108.

Morrow, et al., "Three-Dimensional Wafer Stacking Via Cu-Cu bonding Integrated with 65-nm Strained-SiLow-k CMOS Technology", IEEE Electron Device Letters, vol. 27, No. 5, May 2006, pp. 335-337.

Reed, et al., "Design Aspects of a Microprocessor Data Cache using 3D die Interconnect Technology", 2005 IEEE Int'l Conference on Integrated Circuit and Technology, pp. 15-18.

"Office Action for United Kingdom Application No. GB0724812.3 dated Jun. 5, 2009", Whole Document.

"Office Action with English Translation for German Application No. 10 2007 059 784.5-53 dated Jun. 9, 2009", Whole Document.

Black, et al., "Die Stacking (3D) Microarchitecture, Proceedings of the 39th Annual IEEE/ACM International Symposium on Microarchitecture, Dec 13, 2006, pp. 469-479.", 69-479.

Kipo, "Non-Final Office Action for Korean Application No. 10-2007-0135086, and English Translation dated Sep. 16, 2009", Whole Document.

Nelson, et al., "A 3D Interconnect Methodology Applied to iA32-class Architectures for Performance Improvement through RC Mitigation", Intel Corp. 6 pages, (2004).

Puttaswamy, et al., "Implementing Caches in a 3D Technology for High Performance Processors", Georgia Institute of Technology; School of Electrical and computing engineering, College of Computing, 15 pages, (2005).

"Office Action for Chinese Patent Application No. 200710300796.2", (Nov. 13, 2009), with English Translation, Whole Document.

"First Office Action for Japanese Patent Application No. 2007-329083", (Mar. 4, 2010), Whole Document.

Puttaswamy, et al., "Implementing Cashes in a 3D Technology for High Performance Processors", Proceedings of 2005 IEEE International Confrence on Computer Design: VSLI in Computer and Processors (ICCD 2005), IEEE, 2005, 525-532.

"Office Action for Korean Patent Application No. 10-2007-135086", (Feb. 26, 2010), Whole Document.

"Final Office Action for U.S. Appl. No. 11/286,585", (Aug. 4, 2008), Whole Document.

"Final Office Action for U.S. Appl. No. 11/374,936", (Jun. 29, 2009), Whole Document.

"Non-Final Office Action for U.S. Appl. No. 11/286,585", (Dec. 3, 2007), Whole Document.

"Non-Final Office Action for U.S. Appl. No. 11/374,936", (Nov. 12, 2008), Whole Document.

Beckerman, et al., "Early Load Address Resolution Via Register Tracking, ISCA, May 2000".

Collins, et al., "Dynamic Speculative Precomputation, ISM, Dec. 2001", Whole Document.

Collins, et al., "Speculative Precomputation: Long-Range Prefetching of Delinquent Loads, ISC", (2001), 14-25.

Hassanein, et al., "Data Forwarding Through In-Memory Precomputation, ICS'04, Jun. 26-Jul. 1, 2004".

Rotenberg, et al., "Trace Cache: a Low Latency Approach to High Bandwidth Instruction Fetching, ISM, Dec. 2-4, 1996".

Zilles, et al., "Understanding the Backward Slices of Performance Degrading Instructions, ISC, Jun. 12-14, 2000".

"Office Action with English Translation for German Patent Application No. 10 2007 059 784.5-53", (Feb. 14, 2011), Whole Document.

* cited by examiner

PREFETCHING FROM DYNAMIC RANDOM ACCESS MEMORY TO A STATIC RANDOM ACCESS MEMORY

TECHNICAL FIELD

Embodiments of the invention generally relate to the field of integrated circuits and, more particularly, to systems, methods, and apparatuses for prefetching from a dynamic random access memory (DRAM) to a static random access memory (SRAM).

BACKGROUND

Industrial chip designs are moving towards chip multi-processors (CMPs). In comparison to high frequency uniprocessors, CMPs provide improved performance and reduced power consumption. CMPs use relatively simple cores and rely on thread level parallelism (TLP) to improve performance. Applications running on CMPs have to increase TLP to efficiently utilize the core count.

Increasing TLP, however, also increases memory level parallelism (MLP) by increasing the number of outstanding memory requests per clock. In addition, the data working set of the multi-threaded applications will likely grow with the thread count. Finally, increasing TLP is also likely to increase the randomness of accesses to the shared caches since accesses from several threads will be interleaved. Thus, memory bandwidth and cache capacity should scale with core count to support the increased MLP and data footprint.

Recently, three dimensional (3D) die stacking has been proposed as a viable option for stacking a dense memory die (such as DRAM) on a microprocessor die. Stacking allows disparate Si technologies to be combined in a die stack, without concern for technology integration into a single process flow. Stacking also provides a very-high bandwidth interface between the die using through-silicon-vias. Thus, 3D stacking of memory (such as DRAM) on CMPs may effectively address the memory hierarchy hurdles for CMP scaling.

DRAMs typically keep an open row activated until another row is required to reduce access latency. This technique is called an open-page policy and it works best if successive accesses to the DRAM are to the same open page. Otherwise, bank closes and precharge penalties significantly increase the total latency of accessing a bank. Traditionally, there is only one open page per bank in DRAM designs.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Experience has shown that the locality of accesses to the DRAM is likely to be more random as the number of threads accessing the DRAM increases. Since DRAMs have a limited number of banks (e.g., 16) the number of page opens may increase dramatically as the number of threads increases. Thus, the consequences of bank thrashing could significantly impact the performance of the system.

Embodiments of the invention are generally directed to systems, methods, and apparatuses for prefetching from a dynamic random access memory (DRAM) to a static random access memory (SRAM). In some embodiments, two or more cache lines are transferred from an open page in DRAM to an SRAM. The transfer may occur over a dense interconnect such as a die-to-die via. As is further described below, embodiments of the invention may effectively provide memory resources suitable for CMP scaling.

Figure 1:
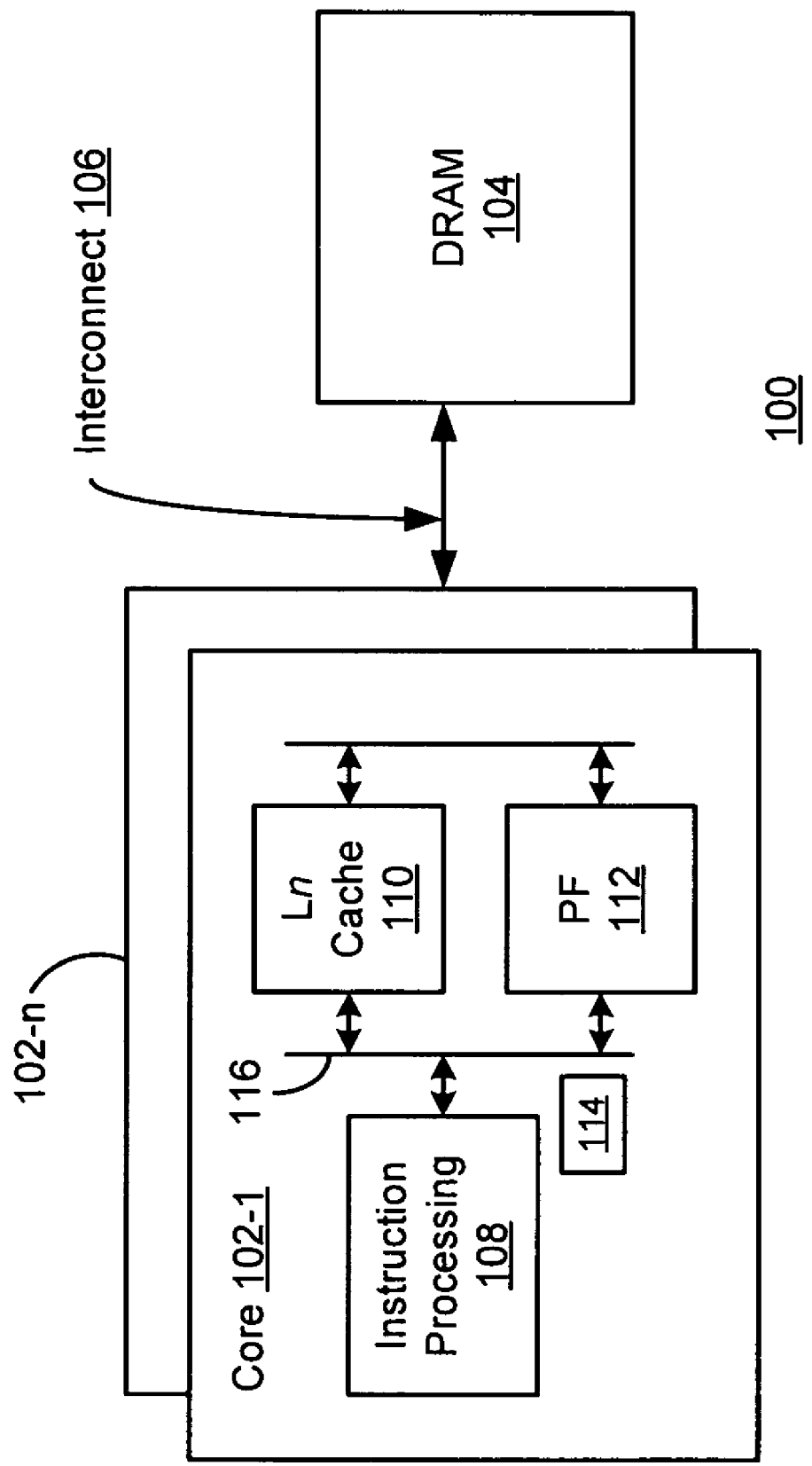
FIG. 1 is a block diagram illustrating selected aspects of a computing system implemented according to an embodiment of the invention.

FIG. 1 is a block diagram illustrating selected aspects of a computing system implemented according to an embodiment of the invention. Computing system 100 includes core(s) 102 coupled with DRAM 104 through interconnect 106. Core 102 may be nearly any core logic of an integrated circuit including a general processing core, a graphics core, and the like. In some embodiments, core 102 is one of a plurality of cores on a die (e.g., a CMP).

Core 102 includes instruction processing logic 108, Ln cache (e.g., L2 cache) 110, and prefetch (PF) logic 112. Instruction processing logic 108 may include one or more elements to process instructions such as an instruction pointer, decode logic, registers, and an L1 cache. In some embodiments instruction logic 108 may also include logic to generate a prefetch hint (e.g., prefetch hint 114). A prefetch hint broadly refers to an indication that two or more load instructions are likely to request data from the same cache page. In some embodiments, the prefetch hint may be a confidence value generated by an instruction pointer (IP) history based stride detection mechanism. In alternative embodiments, a different mechanism may be used to generate the prefetch hint.

Ln cache 110 and PF logic 112 are coupled with instruction processing logic 108 through interconnect 116 (e.g., an L2 bus). In some embodiments, if there is an L1 cache miss, then the miss and prefetch hint 114 are forwarded (directly or through one or more levels in a memory hierarchy) to Ln cache 110 and/or prefetch logic 112. Prefetch logic 112 may determine whether to prefetch two or more cache lines from an open page of DRAM 104 based, at least in part, on prefetch hint 114. For example, if prefetch hint 114 indicates that there is a high probability that a number of LOAD instructions are going to exhibit streaming behavior, then PF logic 112 may transfer an entire open page of data from DRAM 104 to Ln cache 110.

In some embodiments, PF logic 112 may include logic to throttle a prefetch if, for example, the usage level of interconnect 106 is too high. In such embodiments, PF logic 112 may compare the level of confidence (e.g., high, medium, or low) provided by prefetch hint 114 with an indication of interconnect usage level and determine whether or not to prefetch data from DRAM 104. The term "data," as used herein, broadly refers to any type of information, including instructions, in any form recognizable to core 102.

DRAM 104 may be nearly any form of DRAM including commodity DRAM, reduced latency DRAM (RLDRAM), magnetic random access memory (MRAM), and the like. In addition, DRAM 104 may have nearly any number of banks having almost any page size. In some embodiments, DRAM 104 has 16 banks and each page is 4 kilobytes (KB).

Interconnect 106 may be any of a wide range of die-to-die and/or chip-to-chip interconnects. In some embodiments, core 102 and DRAM 104 are vertically stacked and interconnect 106 is a high density die-to-die via. In alternative embodiments, core 102 and DRAM 104 are packaged together in a multi-chip module and interconnect 106 provides a high density interconnect between (at least) some of the chips in the module. In yet other alternative embodiments, core 102 and DRAM 104 may be in separate packages and interconnect 106 connects the packages.

Figure 2:
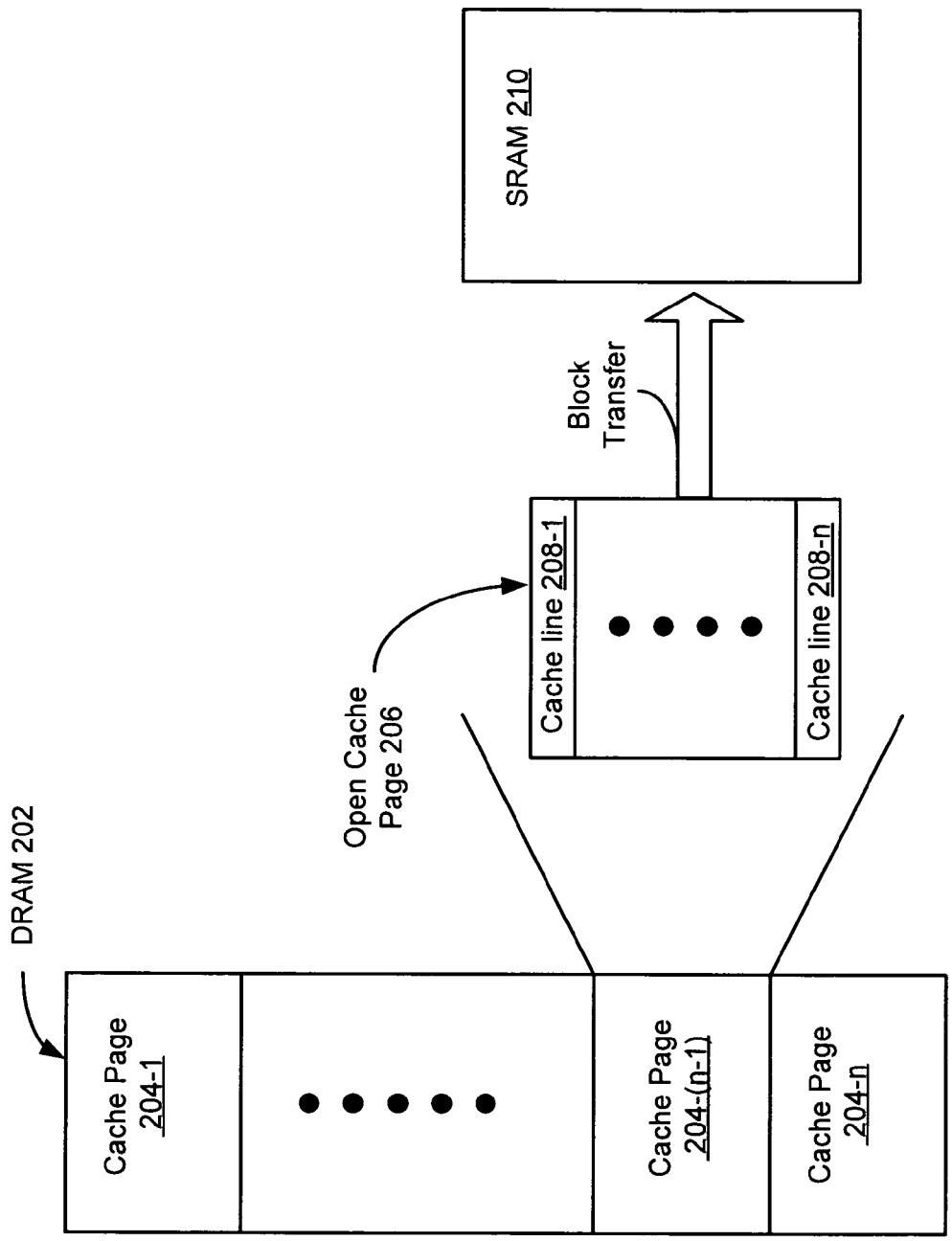
FIG. 2 is a conceptual diagram illustrating a block transfer according to an embodiment of the invention.

FIG. 2 is a conceptual diagram illustrating a block transfer according to an embodiment of the invention. DRAM 202 is organized into one or more cache pages 204. In some embodiments, DRAM 202 has one cache page open at any given time (assuming the device is in operation). For example, in the illustrated embodiment, cache page 206 is open. Each cache page consists of two or more cache lines 208 each having two or more bytes of data. In some embodiments, prefetch logic (e.g., prefetch logic 112, shown in FIG. 1) transfers a block of two or more cache lines from open DRAM cache page 206 to SRAM 210. The decision to transfer a block of cache lines may be based, at least in part, on a prefetch hint (e.g., prefetch hint 114, shown in FIG. 1). Block transfers of data from a DRAM to an SRAM are further described below with reference to FIGS. 3-7.

Figure 3:
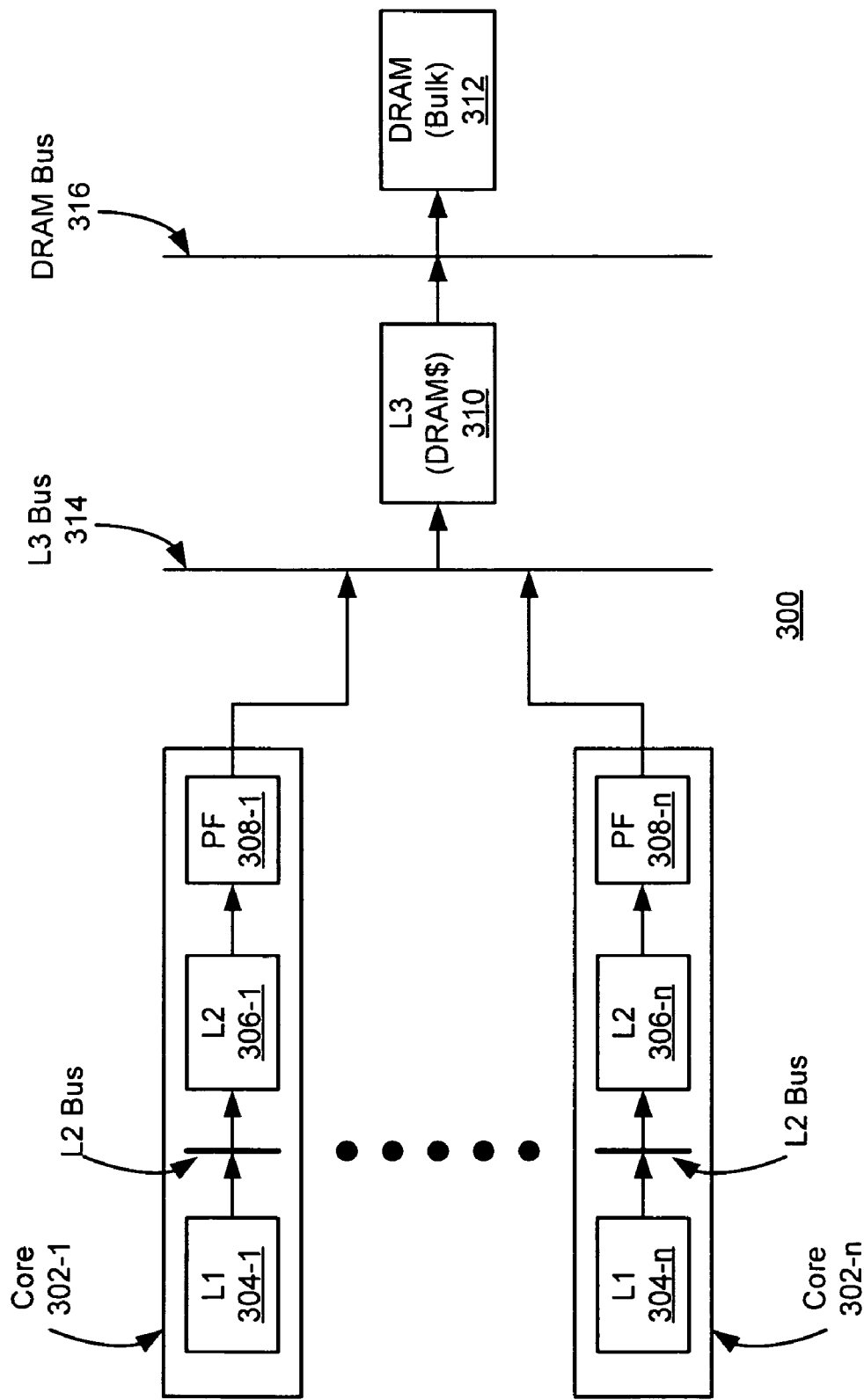
FIG. 3 is a high-level block diagram illustrating selected aspects of a computing system implemented according to an embodiment of the invention.

FIG. 3 is a high-level block diagram illustrating selected aspects of a computing system implemented according to an embodiment of the invention. System 300 includes a plurality of cores 302. Cores 302 may be any of a wide variety of cores includes general processing cores and graphics cores. In some embodiments, each core has a private L1 cache 304 and a private L2 cache 306. In addition, each core (or a subset of the cores) may include PF logic 308.

In some embodiments, DRAM L3 cache 310 is on a die that is vertically stacked with the die that contains cores 302. In such embodiments, L3 bus 314 may be a high density die-to-die interconnect. Bulk DRAM 312 provides system memory and may include a number of memory devices that are separate from cores 302 and DRAM L3 cache 310.

In some embodiments, PF logic 308 transfers two or more cache lines from an open page of DRAM L3 cache to an SRAM L2 cache. The decision to transfer a block of cache lines may be based, at least in part, on a prefetch hint provided to PF logic 308 from instruction processing logic on core 302 (e.g., instruction processing logic 102, shown in FIG. 1). In addition, the decision to transfer a block of cache lines may be based, at least in part, on the level of use experienced by bus 314. In some embodiments, PF logic 308 may transfer an entire page of memory from DRAM L3 310 to SRAM L2 306.

Figure 4:
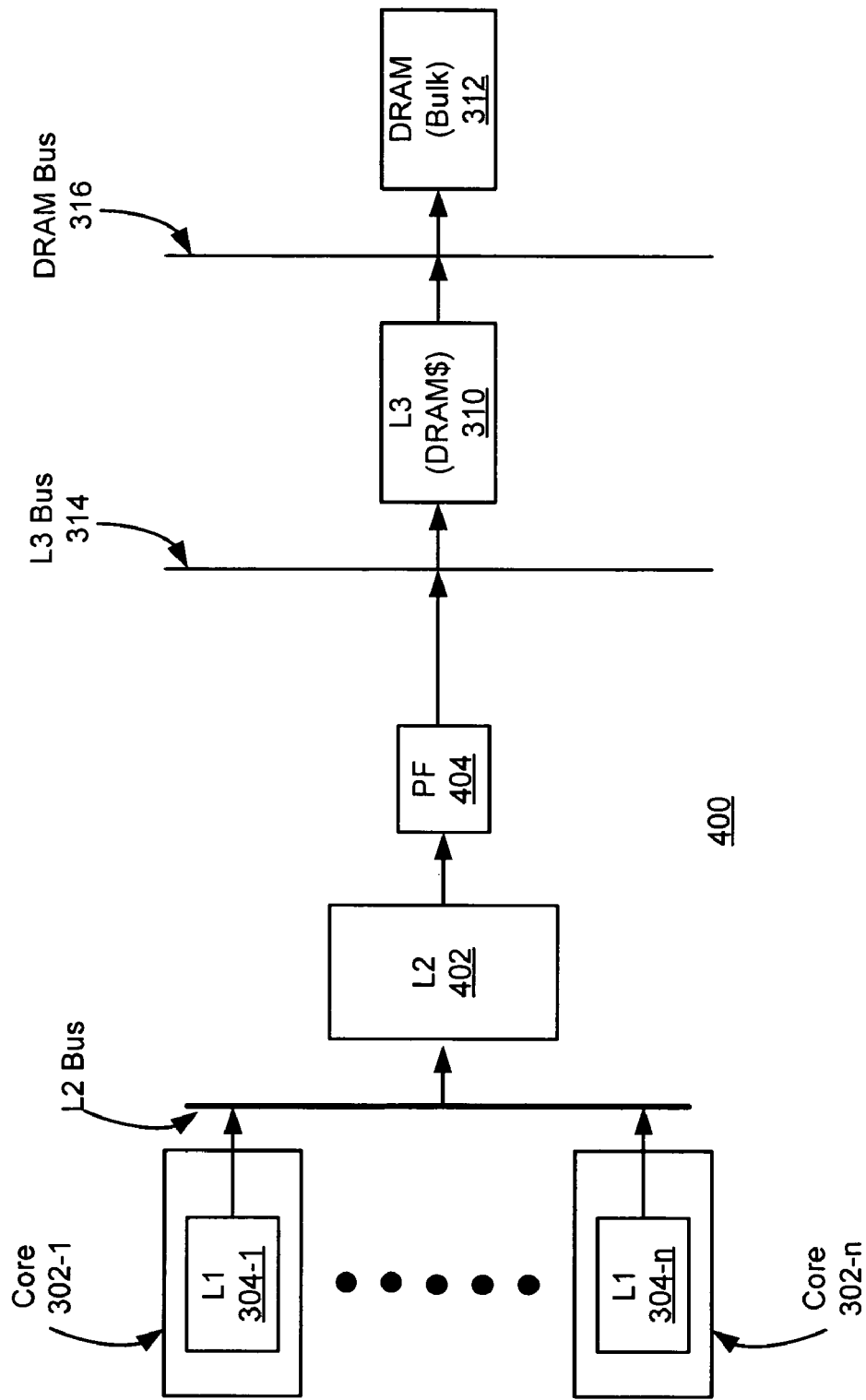
FIG. 4 is a high-level block diagram illustrating an embodiment in which the L2 cache is shared.

FIG. 4 is a high-level block diagram illustrating an embodiment in which the L2 cache is shared. In the illustrated embodiment, each core 302 has a private L1 cache and the cores share L2 cache 402. If there is a miss for L1 cache 304, the miss and a prefetch hint may be forwarded to L2 cache 402 and/or PF logic 404. In some embodiments, PF logic 404 determines whether to transfer two or more cache lines from an open page of DRAM L3 310 based, at least in part, on the prefetch hint. In addition, prefetch logic 404 may base the transfer decision on other factors including the usage level of L3 bus 314.

Figure 5:
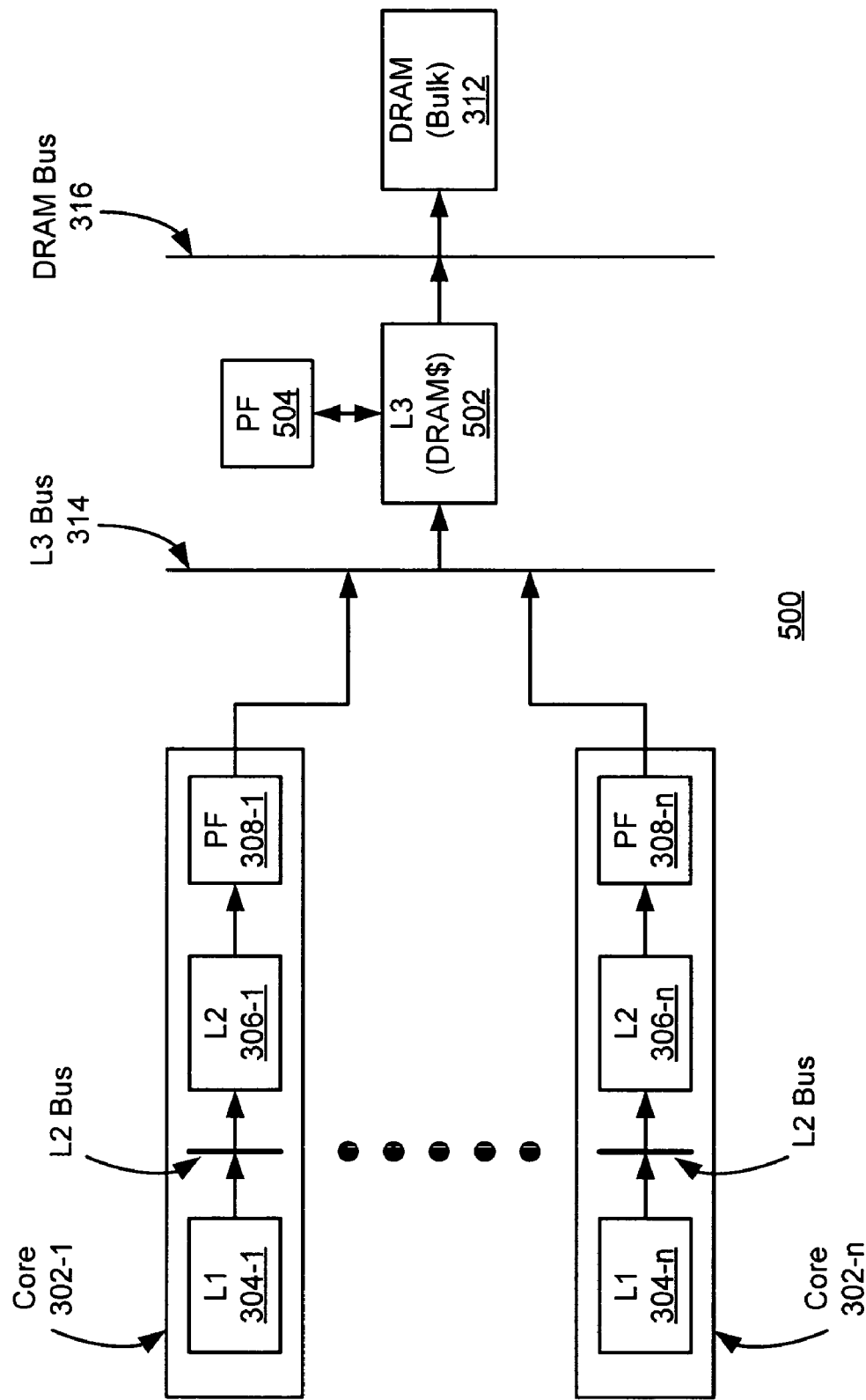
FIG. 5 is a high-level block diagram illustrating an embodiment in which the prefetch logic is used at different levels within the cache hierarchy.

FIG. 5 is a high-level block diagram illustrating an embodiment in which the prefetch logic is used at different levels within the cache hierarchy. In some embodiments, a cache miss (e.g., both an L1 and L2 cache miss) and a prefetch hint may be forwarded to DRAM L3 cache 502 and/or PF logic 504. PF logic 504 may transfer two or more cache lines from an open page of bulk DRAM 312 to DRAM L3 cache 502 based, at least in part, on the prefetch hint (and possibly other factors such as bus usage levels). Prefetch logic 308 may, in turn, transfer two or more cache lines from an open page of DRAM L3 cache 502 to SRAM L2 cache 306. While the illustrated embodiment shows two levels of batch prefetching, it is to be appreciated that the batch transfer of a block of cache lines could be performed nearly any number of times across nearly any number of levels of cache.

Figure 6:
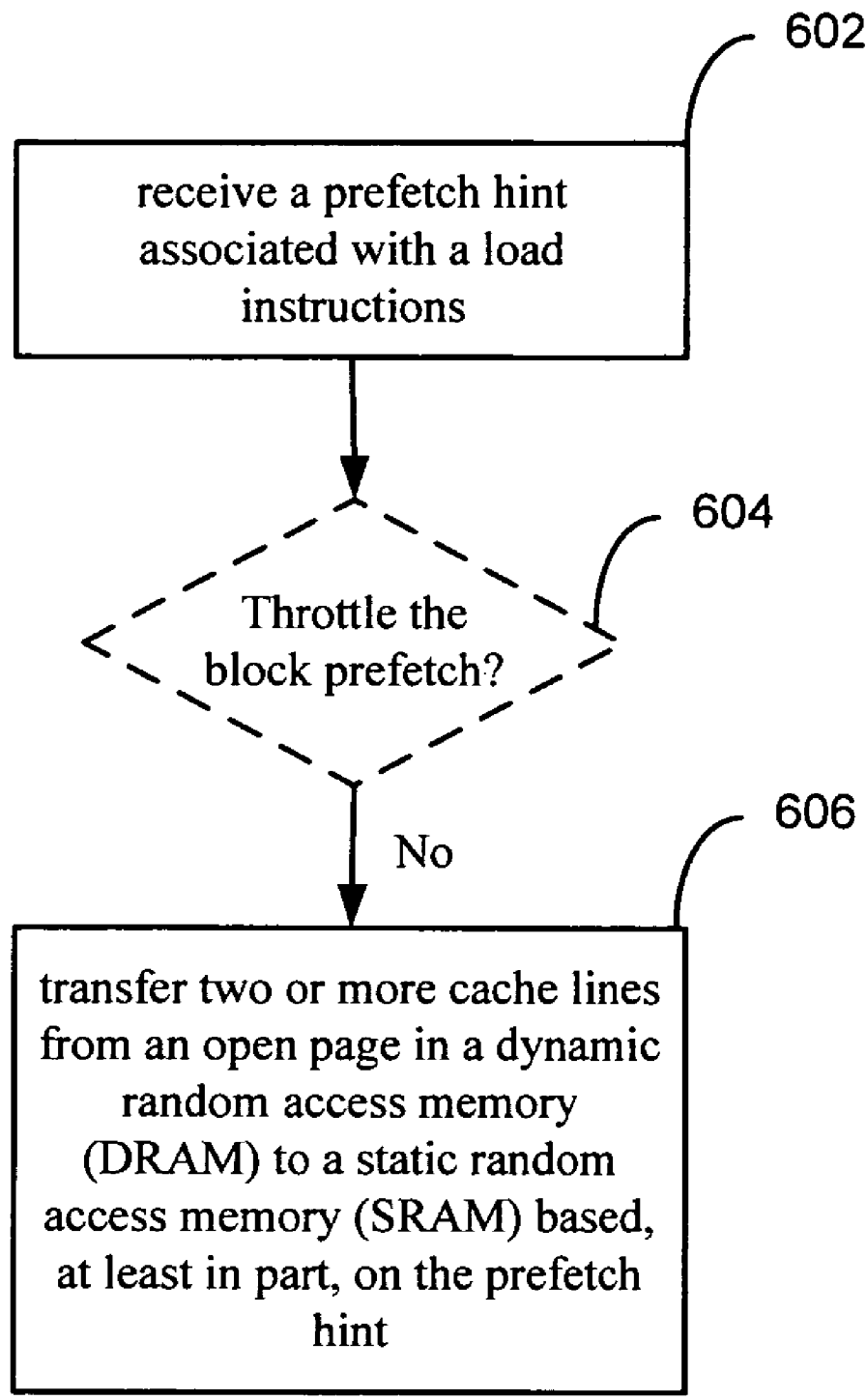
FIG. 6 is a flow diagram illustrating selected aspects of a block transfer according to an embodiment of the invention.

FIG. 6 is a flow diagram illustrating selected aspects of a block transfer according to an embodiment of the invention. Referring to process block 602, prefetch logic (e.g., prefetch logic 112, shown in FIG. 1) receives a prefetch hint associated with a LOAD instruction. In some embodiments, the prefetch hint is generated by an IP-based stride detection algorithm. In such embodiments, the prefetch hint may indicate how likely it is that subsequent LOAD instructions will have a monotonically increasing or decreasing address stride. In some embodiments, the prefetch hint may have any of a number of values indicating a degree of confidence in whether subsequent LOAD instructions will have a monotonically increasing or decreasing address stride. For example, the prefetch hint may indicate a confidence of high, medium, or low. Alternatively, nearly any scheme may be used to indicate the level of confidence.

Referring to process block 604, the PF logic may throttle the block prefetch based on one or more conditions or factors. The term "throttle" can refer to a number of behaviors including delaying a transfer, cancelling a transfer, altering the size of a transfer, and the like. The conditions that trigger a throttling of the transfer may include: a usage level of the interconnect over which the transfer is to occur, a prefetch hint, a power savings level, and the like. As indicated by the dashed line, the throttling mechanism is optional in some embodiments.

Referring to process block 606, the PF logic transfers two or more cache lines from a DRAM to an SRAM based, at least in part, on the prefetch hint. For example, if the prefetch hint indicates a high likelihood that a number of LOAD instructions will have a monotonically increasing or decreasing address stride, then the PF logic may transfer a block of cache lines into cache to increase the likelihood that requested data is stored in cache. The DRAM may be part of the cache hierarch and/or an element of bulk memory. In addition, the SRAM may reside at nearly any level of the cache hierarchy.

Figure 7:
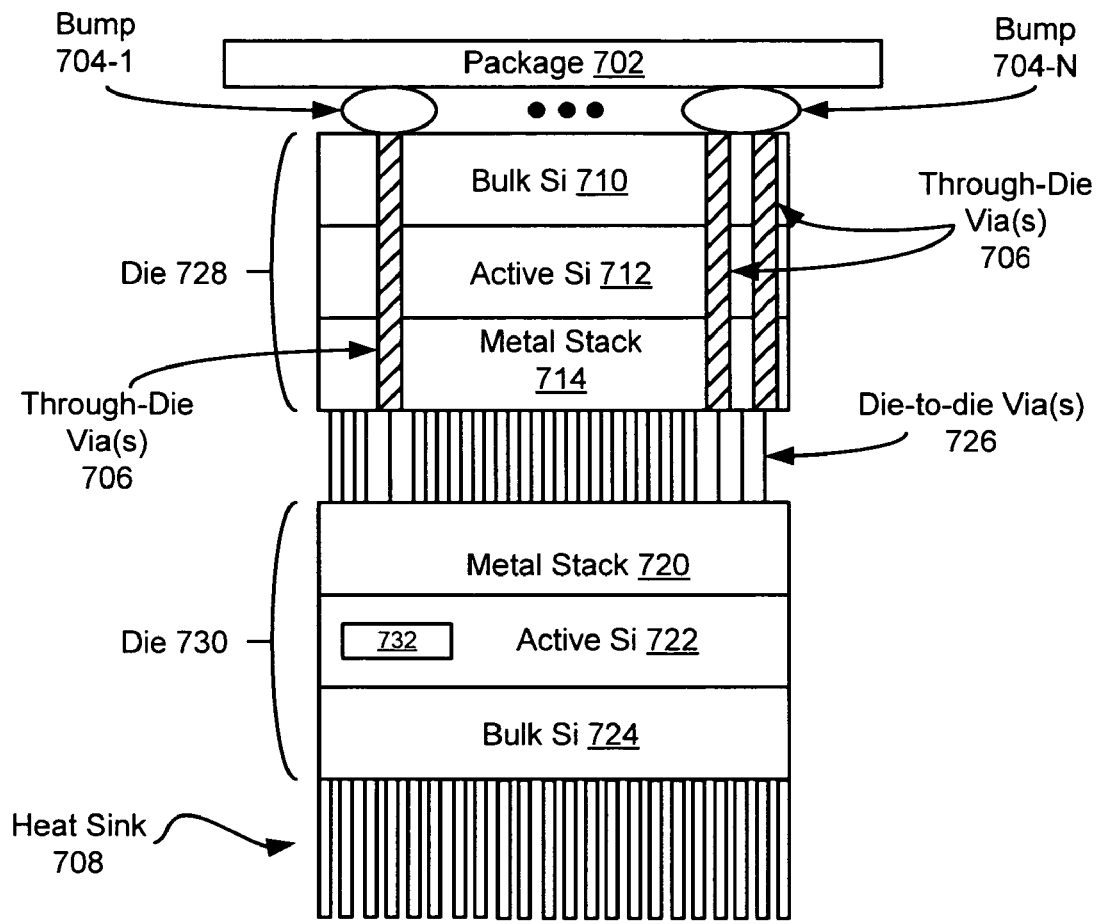
FIG. 7 is a cross-sectional view of a semiconductor device, implemented according to an embodiment of the invention.

FIG. 7 illustrates a cross-sectional view of a semiconductor device 700 in accordance with an embodiment of the invention. Device 700 may include a package 702, die 728, die 730, and die-to-die vias 726. One or more bumps 704-1 through 704-N (collectively referred to herein as "bumps 704") may allow electrical signals including power, ground, clock, and/or input/output (I/O) signals to pass between the package 702 and the die 728. Die 728 may include one or more through-die vias 706 to pass signals between the bumps 704 and the die 730. The device 700 may further include a heat sink 708 to allow for dissipation of generated heat by the die 730 and/or device 700.

Dies 728 and 730 may include various layers. For example, die 728 may include a bulk silicon (SI) layer 710, an active Si layer 712, and a metal stack 714. Die 730 may include a metal stack 720, an active Si layer 722, and a bulk Si layer 724. As shown in FIG. 2, the vias 726 may communicate with the dies 728 and 730 through the metal stacks 714 and 720, respectively. In an embodiment, die 728 may be thinner than die 730. For example, die 728 may include a memory device (such as a random access memory device) and die 730 may include one or more processor cores and/or shared or private caches.

Die 730 includes one or more instances of PF logic 732. In some embodiments, PF logic 732 may transfer two or more cache lines from a DRAM in die 728 to an SRAM in die 730. The transfer may occur through die-to-die vias 726. In some embodiments, the relatively high bandwidth of die-to-die vias 726 enables PF logic 732 to transfer blocks of multiple cache lines without a significant increase in latency.

Device 700 may include additional dies, e.g., to integrate other components into the same device or system. In such an embodiment, die-to-die and/or through-die vias may be used to communicate signals between the various dies (e.g., such as discussed with respect to the vias 726 and 706).

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An integrated circuit comprising:
   a first die to be stacked with a second die, wherein a through-silicon die-to-die via is coupled between the first die and the second die, the first die having:
   a static random access memory (SRAM);
   a bus; and
   a plurality of processor cores coupled to one another by the bus, the plurality of processor cores to further couple to a dynamic random access memory (DRAM) of the second die via the bus and the through-silicon die-to-die via, wherein the bus to experience a level of usage by the plurality of processors, the plurality of processor cores having a first processor core including:
      an L1 cache;
      instruction processing logic to generate a prefetch hint associated with a first load instruction, wherein the instruction processing logic to generate the prefetch hint in response to detecting an instruction pointer history, the prefetch hint representing a level of confidence that two or more load instructions subsequent to the first load instruction are likely to request data from a same cache page, the instruction processing logic further to send the prefetch hint in response to a miss of the L1 cache; and
      prefetch logic coupled to the instruction processing logic, the prefetch logic to compare to one another the level of confidence represented in the prefetch hint and an indication of the level of usage experienced by the bus, the prefetch logic further to determine, based on the comparing, whether or not to prefetch data, and where the prefetch logic determines to prefetch data, the prefetch logic further to transfer two or more cache lines from an open page in the DRAM to the SRAM, wherein data of the two or more cache lines is transferred by way of the through-silicon die-to-die via and the bus, wherein the DRAM provides a level of cache and the SRAM provides a next higher level of cache.

2. The integrated circuit of claim 1, wherein the two or more cache lines comprises a page of memory.

3. The integrated circuit of claim 1, the plurality of cores further having a second core including:
   an second L1 cache;
   second instruction processing logic to generate a second prefetch hint associated with a second load instruction representing a second level of confidence that two or more load instructions subsequent to the second load instruction are likely to request data from a same cache page, the instruction processing logic further to send the second prefetch hint in response to a miss of the second L1 cache; and
   second prefetch logic coupled to the second instruction processing logic, the second prefetch logic to compare to one another the second level of confidence represented in the second prefetch hint and an indication of a second level of usage experienced by the bus, the prefetch logic further to transfer, based on the comparing, two or more other cache lines from an open page in the DRAM to a second SRAM, the transferring the two or more other cache lines via the through-silicon die-to-die via.

4. The integrated circuit of claim 1, wherein the first processor core includes the SRAM.

5. The integrated circuit of claim 1, wherein the DRAM comprises bulk memory.

6. The integrated circuit of claim 1, wherein the level of cache is an L3 cache and the next higher level of cache is an L2 cache.

7. The integrated circuit of claim 6, wherein each of the plurality of processor cores includes a respective prefetch logic.

8. The integrated circuit of claim 6, wherein the processor core comprises a graphics core.

9. A method comprising:
with instruction processing logic of a first processor core, generating a prefetch hint associated with a load instruction, the first processor core including an L1 cache, wherein a first die having a plurality of processor cores including the first processor core is stacked with a second die, wherein a through-silicon die-to-die via is coupled between the first die and the second die, wherein the plurality of cores are coupled to one another by a bus of the first die, and wherein the plurality of cores are further coupled to a dynamic random access memory (DRAM) of the second die by the bus and the through-silicon die-to-die via, wherein the bus experiences a level of usage by the plurality of processors, the generating the prefetch hint in response to detecting an instruction pointer history, the prefetch hint representing a level of confidence that two or more load instructions subsequent to the first load instruction are likely to request data from a same cache page;
in response to a cache miss of the L1 cache, the instruction processing logic sending the prefetch hint; and
with prefetch logic of the first processor core:
comparing to one another the level of confidence represented in the prefetch hint and an indication of the level of usage experienced by the bus;
based on the comparing, determining whether or not to prefetch data; and
in response to determining to prefetch data, transferring two or more cache lines from an open page in the DRAM to a static random access memory (SRAM) of the first die, wherein data of the two or more cache lines is transferred by way of the through-silicon die-to-die via and the bus.

10. The method of claim 9, wherein the level of confidence is one of three or more values.

11. The method of claim 10, wherein the three or more values comprise high, medium, and low.

12. The method of claim 9, wherein transferring the two or more cache lines from the open page in the DRAM comprises:
transferring a cache page from the open page in the DRAM.

13. The method of claim 9, wherein the DRAM comprises bulk memory.

14. The method of claim 9, wherein the DRAM provides a level of cache.

15. A system comprising:
a first die including a dynamic random access memory (DRAM); and
a second die stacked with the first die, wherein a through-silicon die-to-die via is coupled between the first die and the second die, the second die including:
a static random access memory (SRAM);
a bus; and
a plurality of processor cores coupled to one another by the bus, the plurality of processor cores further coupled to the DRAM via the bus and the through-silicon die-to-die via, wherein the bus to experience a level of usage by the plurality of processors, the plurality of processor cores including a first processor core having:
an L1 cache,
instruction processing logic to generate a prefetch hint associated with a first load instruction, wherein the instruction processing logic to generate the prefetch hint in response to detecting an instruction pointer history, the prefetch hint representing a level of confidence that two or more load instructions subsequent to the first load instruction are likely to request data from a same cache page, the instruction processing logic further to send the prefetch hint in response to a miss of the L1 cache, and
prefetch logic coupled to the instruction processing logic, the prefetch logic to compare to one another the level of confidence represented in the prefetch hint and an indication of the level of usage experienced by the bus, the prefetch logic further to determine, based on the comparing, whether or not to prefetch data, and where the prefetch logic determines to prefetch data, the prefetch logic further to transfer two or more cache lines from an open page in the DRAM to the SRAM, wherein data of the two or more cache lines is transferred by way of the through-silicon die-to-die via and the bus, and wherein the DRAM provides a level of cache and the SRAM provides a next higher level of cache.

16. The system of claim 15, wherein the two or more cache lines comprises a page of memory.

17. The system of claim 15, the plurality of cores further having a second core including:
an second L1 cache;
second instruction processing logic to generate a second prefetch hint associated with a second load instruction representing a second level of confidence that two or more load instructions subsequent to the second load instruction are likely to request data from a same cache page, the instruction processing logic further to send the second prefetch hint in response to a miss of the second L1 cache; and
second prefetch logic coupled to the second instruction processing logic, the second prefetch logic to compare to one another the second level of confidence represented in the second prefetch hint and an indication of a second level of usage experienced by the bus, the prefetch logic further to transfer, based on the comparing, two or more other cache lines from an open page in the DRAM to a second SRAM, the transferring the two or more other cache lines via the through-silicon die-to-die via.

18. The integrated circuit of claim 15, wherein the processor core comprises a graphics core.

* * * * *